US009774521B2

(12) United States Patent
Fanara

(10) Patent No.: US 9,774,521 B2
(45) Date of Patent: Sep. 26, 2017

(54) SYSTEMS AND METHODS FOR INTRA-CONSIST COMMUNICATION

(71) Applicant: Electro-Motive Diesel, Inc., LaGrange, IL (US)

(72) Inventor: Mark Alan Fanara, Blue Springs, MO (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 43 days.

(21) Appl. No.: 14/677,471

(22) Filed: Apr. 2, 2015

(65) Prior Publication Data
US 2016/0294676 A1    Oct. 6, 2016

(51) Int. Cl.
H04L 12/28    (2006.01)
H04L 12/721    (2013.01)

(52) U.S. Cl.
CPC .............. *H04L 45/14* (2013.01); *H04L 45/12* (2013.01)

(58) Field of Classification Search
CPC ........ H04L 45/14; H04L 45/12; H04L 84/005
See application file for complete search history.

(56) References Cited

U.S. PATENT DOCUMENTS

| 4,679,189 | A | * | 7/1987 | Olson | ...................... H04L 45/22 370/396 |
| 4,905,233 | A | * | 2/1990 | Cain | ....................... H04L 45/00 370/237 |
| 5,008,882 | A | * | 4/1991 | Peterson | ............ G06F 15/17368 370/406 |
| 6,370,119 | B1 | * | 4/2002 | Basso | ...................... H04L 45/12 370/252 |
| 6,400,281 | B1 | | 6/2002 | Darby, Jr. et al. | |
| 6,542,469 | B1 | * | 4/2003 | Kelley | ..................... H04L 45/00 370/238 |
| 8,493,923 | B2 | | 7/2013 | Lee et al. | |
| 8,625,485 | B2 | | 1/2014 | Lee et al. | |
| 2002/0150041 | A1 | * | 10/2002 | Reinshmidt | ......... H04L 12/2697 370/216 |
| 2004/0219922 | A1 | * | 11/2004 | Gage | ...................... H04W 40/16 455/445 |
| 2007/0195702 | A1 | * | 8/2007 | Yuen | ...................... H04L 45/121 370/238 |
| 2010/0074194 | A1 | * | 3/2010 | Liu | ....................... H04L 45/124 370/329 |

(Continued)

FOREIGN PATENT DOCUMENTS

WO    WO 2014/009301    1/2014

*Primary Examiner* — Robert Wilson
(74) *Attorney, Agent, or Firm* — Finnegan, Henderson, Farabow, Garrett & Dunner, LLP

(57) ABSTRACT

A method of communicating between a source node and a target node includes, for each of a plurality of paths between the target node and the source node, determining a total number of intermediary nodes and an expected data rate. The method also includes identifying each of the plurality of paths for which the total number of intermediary nodes is equal to or below a ceiling number as a first group of paths and identifying each of the plurality of paths for which the expected data rate is equal to or exceeds a threshold data rate as a second group of paths. A preferred path is used to communicate between the target node and the source node, the preferred path being included in the first group of paths and the second group of paths.

20 Claims, 3 Drawing Sheets

(56) References Cited

U.S. PATENT DOCUMENTS

| | | | |
|---|---|---|---|
| 2010/0246480 A1* | 9/2010 | Aggarwal | H04L 45/123 370/328 |
| 2013/0170499 A1* | 7/2013 | Ramanujan | H04W 40/26 370/401 |
| 2014/0211632 A1 | 7/2014 | Saad et al. | |
| 2014/0269260 A1 | 9/2014 | Xue | |
| 2014/0269331 A1 | 9/2014 | Pfeifer et al. | |
| 2014/0362686 A1* | 12/2014 | Jogalekar | H04L 47/12 370/229 |

* cited by examiner

SYSTEMS AND METHODS FOR INTRA-CONSIST COMMUNICATION

TECHNICAL FIELD

This disclosure relates generally to communication networks and, more specifically, to a system and method for communicating data among locomotives in a consist.

BACKGROUND

Often, it is not possible or preferable for communications between two nodes in a communication network to involve a direct path between the target node and the source node. Sometimes, it is preferable for communications between two nodes to be sent via a path that includes intermediate nodes. For example, nodes associated with locomotives in a consist may be interconnected in a linear manner and may communicate messages between a target node and a source node via multi-hop routing. Determining which path for a communication from a source node to a target node based upon factors such as bandwidth and the number of hops may increase the speed at which the communication is sent.

One proposed implementation of intra-consist communication is described in U.S. Pat. No. 6,370,119 B1 ("the '119 patent"). The '119 patent is directed to a system and method for determining the optimal path for routing a communication in a communication network between a source node and at least one target node. The determination is based upon an evaluation of the path offering the widest bandwidth in the direction of the data transmission, the lowest additive cost, and the lowest hop count. Each link of the network is associated with a least restrictive cost and an additive cost reflecting selected link characteristics. A path is characterized by a restrictive cost and an additive cost derived from the link costs of its communication links. For a connection to be routed, the system identifies a source node, a target node, and a maximum restrictive cost allowed for routing the connection. All acceptable paths from the source node to all the other nodes of the network are determined and stored. These paths are deemed acceptable and are stored if they have the lowest restrictive cost that allows the routing of the connection and if they have the lowest additive cost and minimum hop count. Finally, from the plurality of stored acceptable paths, the path that originates from the source node and terminates at the destination node is selected as the optimal path to route the connection.

The method and system provided by the '119 patent may be subject to a number of possible drawbacks. For example, the method and system of the '119 patent use a protocol that only identifies an optimal path. It may be advantageous to identify a plurality of acceptable paths between a source node and a target node in the event that an optimal path does not function properly. Further, the method and system provided by the '119 patent evaluate paths only based upon the communication link of the path that has the lowest bandwidth available. That is, the method and system of the '119 patent compare the lowest bandwidth link of two paths, preferring the path whose lowest link bandwidth is higher. It may be advantageous to consider the bandwidth of the entire path to compare paths to one another, rather than comparing the lowest bandwidth of a communication link in each of the paths.

The presently disclosed systems and methods are directed to overcoming one or more of the problems set forth above and/or other problems in the art.

SUMMARY

In one aspect, this disclosure is directed to a consist. The consist may include a first locomotive associated with a source node and a second locomotive associated with a target node. The target node may be communicatively coupled to the source node by a plurality of paths. The consist may also include at least one intermediary locomotive associated with an intermediary node. The intermediary node may be communicatively coupled to the source node and the target node. The consist may also include a communication controller configured to, for each of the plurality of paths, determine the total number of intermediary nodes and an expected data rate. The communication controller may also be configured to identify each of the plurality of paths for which the total number of intermediary nodes is equal to or below a ceiling value as a first group of paths and identify each of the plurality of paths for which the expected data rate is equal to or above a threshold data rate as a second group of paths. The communication controller may be further configured to identify a preferred path, wherein the preferred path is included in the first group of paths and the second group of paths.

According to another aspect, this disclosure is directed to system for multi-hop routing communication between a target node and a source node. The system may include a plurality of paths communicatively connecting the target node to the source node, wherein each of the paths includes at least one intermediary node. The system may also include a communication controller. The communication controller may be configured to, for each of the plurality of paths, determine a total number of intermediary nodes and an expected data rate. The communication controller may also be configured to identify each of the plurality of paths for which the total number of intermediary nodes is equal to or below a ceiling value as a first group of paths and to identify each of the plurality of paths for which the expected data rate is equal to or exceeds a threshold data rate as a second group of paths. The communication controller may be further configured to identify a preferred path, wherein the preferred path is included in the first group of paths and the second group of paths.

According to another aspect, this disclosure is directed to a method of communicating between a source node and a target node. The method may include, for each of a plurality of paths between the target node and the source node, determining a total number of intermediary nodes and an expected data rate. The method may also include identifying each of the plurality of paths for which the total number of intermediary nodes is equal to or below a ceiling number as a first group of paths and identifying each of the plurality of paths for which the expected data rate is equal to or exceeds a threshold data rate as a second group of paths. A preferred path is used to communicate between the target node and the source node, the preferred path being included in the first group of paths and the second group of paths.

DETAILED DESCRIPTION

Reference will now be made in detail to the exemplary embodiments implemented according to the disclosure, the examples of which are illustrated in the accompanying drawings. Wherever possible, the same reference numbers will be used throughout the drawings to refer to the same or like parts.

Figure 1:
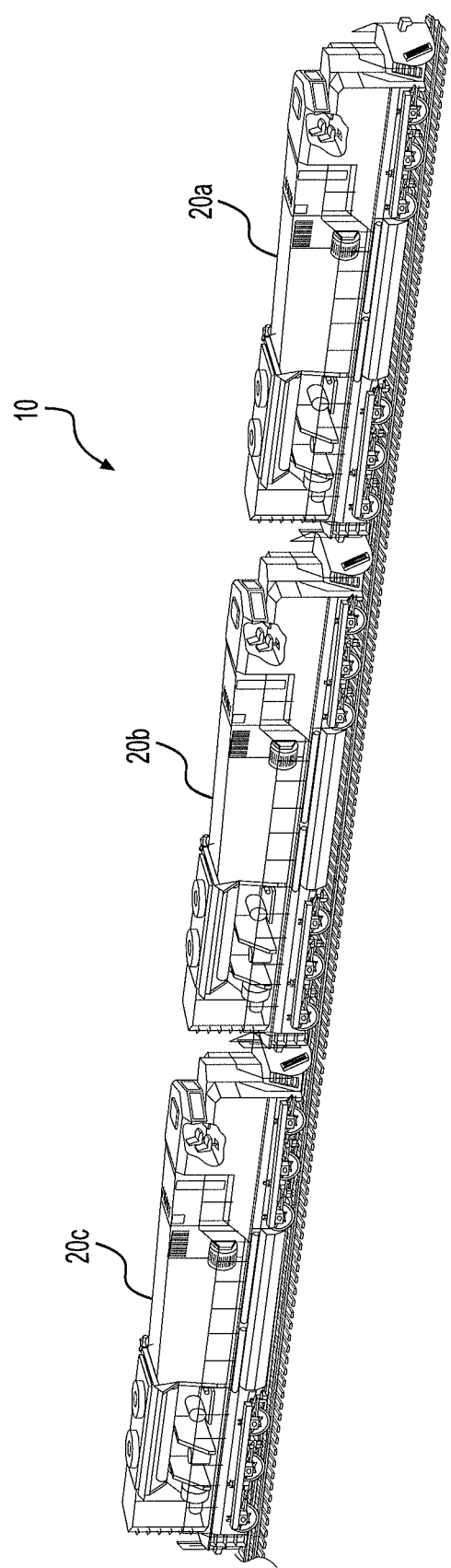
FIG. 1 provides an exemplary embodiment of a consist.

FIG. 1 is a perspective view of an exemplary embodiment of a consist 10 including a plurality of locomotives, such as a first locomotive 20a, an intermediate locomotive 20b, and a second locomotive 20c. Although not shown in FIG. 1, exemplary consist 10 may include other locomotives in addition to first locomotive 20a, intermediate locomotive 20b, and second locomotive 20c. Additionally, consist 10 may also include a variety of other railroad cars, such as, for example, freight cars, tender cars, and/or passenger cars and may employ different arrangements of the cars and locomotives to suit the particular use of consist 10.

First locomotive 20a, intermediate locomotive 20b, and second locomotive 20c may be any electrically powered rail vehicles and may include any number of subsystems for operation (not shown). Such subsystems may include those for traction, braking, exhaust, energy distribution, and cooling. One or more control settings may be associated with at least one of the locomotive subsystems. Such control settings may include powering on/off, adjusting pressure, braking force, speed, or any other feature of locomotive subsystems.

Figure 2:
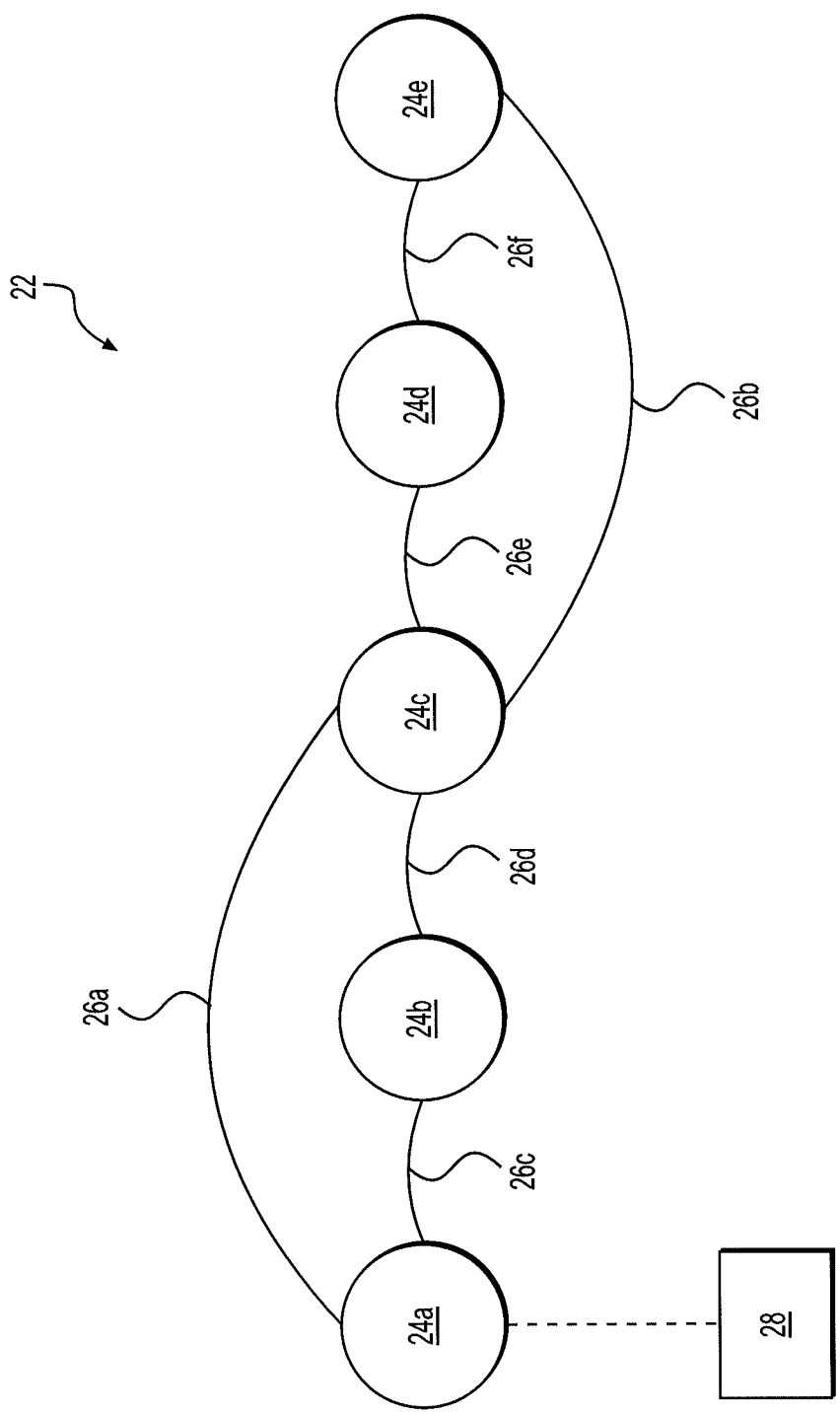
FIG. 2 is a schematic of an exemplary communication system.

FIG. 2 is a block diagram of an exemplary embodiment of a system 22. System 22 may include a plurality of nodes. For example, the exemplary embodiment of FIG. 2 includes five nodes, 24a-24e. According to some embodiments, these nodes 24a-24e may be associated with one or more locomotives 20a-20c. For example, node 24a may be associated with first locomotive 20a, and node 24b may be associated with intermediate locomotive 20b. Each of these nodes is connected to each of the other nodes, either directly or indirectly, by communication links 26a-26f. Communication links 26a-26f may include one or more types of topologies, including bus and point-to-point connections as well as wireless topologies. That is, each node is communicatively coupled to one another by or more paths comprised of one or more communication links 26a-26f. Those that are connected to one another indirectly are connected via intermediary nodes. For example, node 26b is connected indirectly to node 24d, by communication links 26d and 26e and intermediary node 24c. Some nodes 24a-24e may be connected through multiple paths. For example, node 24a is connected to node 24c by at least two paths: directly, via communication link 26a, and indirectly, through node 24b via communication links 26c and 26d.

For data communication among nodes 24a-24e, it may be desirable to determine a preferred path between two nodes 24a-24e. To evaluate different paths that connect two nodes 24a-24e, it may be desirable to know how fast a particular data node 24a-24e or a particular communication link 26a-26f can transmit data. Nodes 24a-24e may be rated or marketed or measured as having an actual or estimated maximum data forwarding rate. These values may differ from one another among nodes 24a-24e. Communication links 26a-26f may be rated or marketed or measured as having an actual or estimated maximum data forwarding rate. These values may differ from one another among communication links 26a-26f.

Based on these and/or other factors, a communication controller 28 may be configured to identify a preferred path between two nodes 24a-24e. Communication controller 28 may optionally be communicatively coupled to one or more nodes 24a-24e. For example, as shown in the exemplary embodiment of FIG. 2, communication controller 28 is communicatively coupled to nodes 24a-24e. Additionally or alternatively, there may be multiple communication controllers 28, so that each of nodes 24a-24e are communicatively coupled to at least one communication controller 28.

Figure 3:
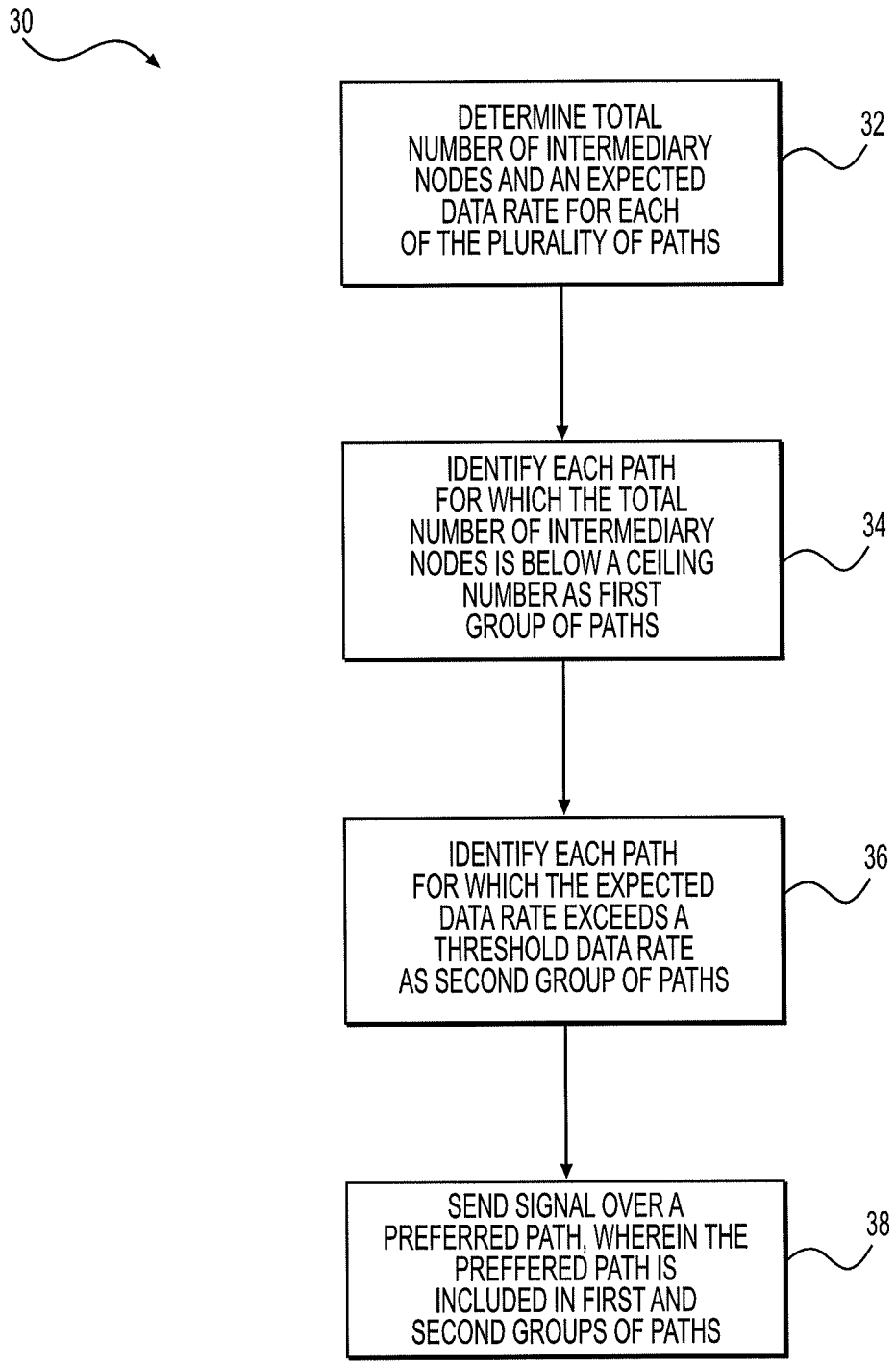
FIG. 3 is flowchart of an exemplary process of communicating data between a source node and a target node.

FIG. 3 is a flowchart of an exemplary method 30. Method 30 may be performed by communication controller 28 to communicate data between two nodes 24a-24e. For example, at step 32, method 30 may include, for each of a plurality of paths between two nodes 24a-24e, determining a total number of intermediary nodes 24a-24e and an expected data rate. In the exemplary path between node 24a and node 24c, node 24b may be an intermediary node. The number of intermediary nodes for this example is one.

According to some embodiments, the expected data rate of a path may be equal to the highest data rate of the node 24a-24e and/or communication link 26a-26f having the lowest maximum data rate within that path. For example, one of the paths between node 24a and node 24c includes communication links 26c and 26d and node 24b. If node 24b and communication link 26c each have a maximum data rate of 60, and communication link 26d had a maximum data rate of 45, then the expected data rate of that path may be 45. According to some embodiments, the expected data rate of a path may be equal to a weighted average of the data rates of each of the nodes 24a-24e and communication links 26a-26f within that path. For example, the weighted average could include factoring in the lengths of communication links 26a-26f.

At step 34, method 30 may include identifying each of the plurality of paths for which the total number of intermediary nodes is equal to or below a ceiling number as a first group of paths. The ceiling number may be a number set based on the number of nodes 24a-24e. Additionally or alternatively, the ceiling number may be set based on user input. According to some embodiments, the ceiling number may be the lowest total number of intermediary nodes 24a-24e. For example, one path between nodes 24a and 24c includes node 24b and communication links 26c and 26d, and another path between nodes 24a and 24c includes only communication link 26a. Thus, the ceiling number may be zero, the number of nodes 24a-24e within the path having the smallest number of intermediary nodes 24a-24e, which is the path including communication link 26a. According to some embodiments, the ceiling number is the sum of the lowest total number of intermediary nodes and a data node margin. For example, if the data node margin is two, then in the previous example, the ceiling number would be the sum of the lowest total number of intermediary nodes (zero) and the data margin (two), such that the ceiling number would equal two.

At step 36, method 30 may include identifying each of the plurality of paths for which the expected data rate equals or exceeds a threshold data rate as the second group of paths. According to some embodiments, the threshold data rate may be the highest expected data rate of the paths. For example, if a first path has an expected data rate of 45 and another path has an expected data rate of 50, then the threshold data rate may be 50. According to some embodiments, the threshold data rate may be within a predefined range of the highest expected data rate. Referring to the previous example, if the predefined range is 10%, then the range may be 45 to 55. According to some embodiments, the lower of the predefined range (45 in the example) may be the threshold data rate.

At step 38, method 30 may include sending a signal over a preferred path, wherein the preferred path is included in the first group of paths and the second group of paths. For example, the preferred path may be the one with the highest expected data rate. Additionally or alternatively, the preferred path may be the one with the lowest number of intermediary nodes. Additionally or alternatively, the preferred path may be selected based on a function of the expected data rates and the total number of intermediary nodes of each of the paths.

Additionally or alternatively, method 30 may include additional parameters for selecting the preferred path. For example, method 30 may include identifying a desired number of paths to be in both the first and second group of paths. If the number of paths in both groups exceeds desired number of paths, method 30 may include removing one or more paths from one or both groups. For example, if the desired number of paths is four and there are five paths in both groups, method 30 may include removing one path from one or both groups. For example, method 30 may remove the path with the lowest expected data rate from the first and/or second group of paths.

According to some embodiments, method 30 may include determining the preferred path in a round-robin style. Additionally or alternatively, the preferred path may be picked at random. According to some embodiments, method 30 may include determining the Hamming distance between each path and a reference path. The reference path may be the path with the highest expected data rate. Method 30 may include removing from at least one of the first group and the second group each path for which the Hamming distance is less than a preferred Hamming distance value.

Embodiments herein include computer-implemented methods, systems, and user interfaces. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random-access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such as a plurality of memories and/or computer-readable storage mediums. As referred to herein, a "memory" may include any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage mediums may be utilized in implementing a computer-implemented method. The term "computer-readable storage medium" should be understood to include tangible items and exclude carrier waves and transient signals.

INDUSTRIAL APPLICABILITY

The disclosed systems and methods provide a robust solution for intra-consist communication. For example, the presently described systems and methods allow preferred connections between two nodes to be identified and used. The presently disclosed systems and methods may have several advantages over other attempted solutions. For example, the disclosed systems and methods may identify a plurality of acceptable paths between a source node and a target node in the event that an optimal path does not function properly. Further, the disclosed systems and methods consider the bandwidth of the entire path to compare paths to one another rather than comparing the lowest bandwidth of a particular communication link within the paths. This allows for a more accurate identification of the preferred paths.

It will be apparent to those skilled in the art that various modifications and variations can be made to the disclosed systems and methods for intra-consist communication. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A consist having a plurality of locomotives, comprising:
   a first locomotive associated with a source node;
   a second locomotive associated with a target node, the target node communicatively coupled to the source node by a plurality of paths;
   at least one intermediary locomotive associated with an intermediary node, the intermediary node communicatively coupled to the source node and the target node via at least one path of the plurality of paths;
   at least one communication controller; and
   memory to store instructions for execution by the at least one communication controller, the at least one communication controller communicatively coupled to the memory, each of the source node of the first locomotive, the target node of the second locomotive and the intermediary node of the at least one intermediary locomotive, the at least one communication controller configured to:
   for each of the plurality of paths, determine the total number of intermediary nodes and an expected data rate;
   identify each of the plurality of paths for which the total number of intermediary nodes is equal to or below a ceiling value as a first group of paths;
   identify each of the plurality of paths for which the expected data rate is equal to or above a threshold data rate as a second group of paths;
   identify a preferred path, wherein the preferred path is included in the first group of paths and the second group of paths; and
   send a desired communication signal over the preferred path.

2. The consist of claim 1, wherein the preferred path has the highest expected data rate.

3. The consist of claim 1, wherein the threshold data rate is the highest expected data rate of the paths.

4. The consist of claim 1, wherein the threshold data rate is within a predefined range of the highest expected data rate.

5. A system for multi-hop routing communication between a target node and a source node, the system comprising:
   a plurality of paths communicatively connecting the target node to the source node, wherein each of the paths includes at least one intermediary node;
   at least one communication controller; and memory to store instructions for execution by the at least one communication controller, the at least one communication controller communicatively coupled to the memory, each of the source node, the target node and the at least one intermediary node, the at least one communication controller configured to:

for each of the plurality of paths, determine a total number of intermediary nodes and an expected data rate;

identify each of the plurality of paths for which the total number of intermediary nodes is equal to or below a ceiling value as a first group of paths;

identify each of the plurality of paths for which the expected data rate is equal to or exceeds a threshold data rate as a second group of paths;

identify a preferred path, wherein the preferred path is included in the first group of paths and the second group of paths; and send a desired communication signal over the preferred path.

6. The system of claim 5, wherein the preferred path has the highest expected data rate.

7. The system of claim 5, wherein the communication controller is further configured to select the preferred path by at least one of round robin and random.

8. The system of claim 5, wherein the threshold data rate is within a predefined range of the highest expected data rate.

9. The system of claim 5, wherein the ceiling number of data nodes is the lowest total number of intermediary nodes.

10. The system of claim 5, wherein the communication controller is further configured to:

identify a desired number of paths to be included in both the first and second group of paths;

determine whether the number of paths that are in both the first and second group of paths exceeds the desired number; and if the number of paths exceeds the desired number, remove from at least one of the first group and the second group paths for which the expected data rate is the lowest of the expected data rates of the paths in the first and second group of paths.

11. The system of claim 5 wherein the communication controller is further configured to:

for each path, determine the Hamming distance between the path and a reference path, wherein the reference path is the path with the highest expected data rate; and remove from at least one of the first group and the second group each path for which the Hamming distance is less than a preferred Hamming distance value.

12. A method for communicating between a source node and a target node, the method comprising:

for each of a plurality of paths between the target node and the source node, determining a total number of intermediary nodes and an expected data rate;

identifying each of the plurality of paths for which the total number of intermediary nodes is equal to or below a ceiling number as a first group of paths;

identifying each of the plurality of paths for which the expected data rate is equal to or exceeds a threshold data rate as a second group of paths; and using a preferred path to communicate between the target node and the source node, wherein the preferred path is included in the first group of paths and the second group of paths.

13. The method of claim 12, wherein the preferred path has the highest expected data rate.

14. The method of claim 12, wherein the threshold data rate is the highest expected data rate of the paths.

15. The method of claim 12, wherein the threshold data rate is within a predefined range of the highest expected data rate.

16. The method of claim 12, wherein the preferred path has the lowest total number of intermediary nodes.

17. The method of claim 12, wherein the ceiling number of data nodes is the lowest total number of intermediary nodes.

18. The method of claim 12, wherein the ceiling number of data nodes is the sum of the lowest total number of intermediary nodes and a data node margin.

19. The method of claim 12, further including:

determining whether the number of paths that are in both the first and second group of paths exceeds a desired number; and if the number of paths exceeds the desired number, removing from at least one of the first group and the second group paths for which the expected data rate is the lowest of the expected data rates of the paths in the first and second group of paths.

20. The method of claim 12, further including:

for each path, determining the Hamming distance between the path and a reference path, wherein the reference path is the path with the highest expected data rate; and removing from at least one of the first group and the second group each path for which the Hamming distance is less than a preferred Hamming distance value.

* * * * *